(12) United States Patent
Wu et al.

(10) Patent No.: US 11,852,602 B2
(45) Date of Patent: Dec. 26, 2023

(54) LIQUID DETECTION DEVICE AND METHOD FOR MANUFACTURING THE SAME

(71) Applicant: InnoLux Corporation, Miao-Li County (TW)

(72) Inventors: Fuh-Tsang Wu, Miao-Li County (TW); Yi-Hung Lin, Miao-Li County (TW); Huei-Ying Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/748,531

(22) Filed: May 19, 2022

(65) Prior Publication Data
US 2022/0397542 A1  Dec. 15, 2022

(30) Foreign Application Priority Data

Jun. 15, 2021  (CN) .......................... 202110663524.9

(51) Int. Cl.
*G01N 27/12* (2006.01)
*G01N 27/07* (2006.01)
*G01N 27/06* (2006.01)

(52) U.S. Cl.
CPC .......... *G01N 27/126* (2013.01); *G01N 27/06* (2013.01); *G01N 27/07* (2013.01)

(58) Field of Classification Search
CPC ...... G01N 27/06; G01N 27/07; G01N 27/126; G01N 27/4035
See application file for complete search history.

(56) References Cited

U.S. PATENT DOCUMENTS

| | | | |
|---|---|---|---|
| 2016/0054255 A1* | 2/2016 | Wu | G01N 27/3276 156/182 |
| 2017/0356868 A1* | 12/2017 | Asmus | F01N 13/008 |
| 2019/0025273 A1* | 1/2019 | Brondum | G01N 27/07 |
| 2020/0103367 A1* | 4/2020 | Chen | G01N 27/30 |
| 2020/0264131 A1* | 8/2020 | Gahlings | G01N 27/4165 |

FOREIGN PATENT DOCUMENTS

| | | |
|---|---|---|
| TW | 200617380 A | 6/2006 |
| TW | 200822177 A | 5/2008 |
| TW | 202014698 A | 4/2020 |
| TW | 202014698 A | 4/2020 |

* cited by examiner

*Primary Examiner* — Alvaro E Fortich
*Assistant Examiner* — Adam S Clarke
(74) *Attorney, Agent, or Firm* — Muncy, Geissler, Olds & Lowe

(57) ABSTRACT

A liquid detection device and a method for manufacturing the same are provided. The liquid detection device includes: a substrate; a working electrode disposed on the substrate, wherein the working electrode includes a first metal portion and a first sensing portion, and the first sensing portion is disposed on the first metal portion; and a reference electrode disposed on the substrate.

16 Claims, 9 Drawing Sheets

LIQUID DETECTION DEVICE AND METHOD FOR MANUFACTURING THE SAME

CROSS REFERENCE TO RELATED APPLICATION

This application claims the benefits of the Chinese Patent Application Serial Number 202110663524.9, filed on Jun. 15, 2021, the subject matter of which is incorporated herein by reference.

BACKGROUND

1. Field

The present disclosure relates to a liquid detection device. More specifically, the present disclosure relates to a liquid detection device comprising a pH sensing module.

2. Description of Related Art

In previous industrial liquid detection devices, the working electrode and the reference electrode are independent components and then assembled into a liquid detection device. The manufacturing process is complicated, and the accuracy of the liquid detection device has to be improved.

Therefore, it is desirable to develop a liquid detection device.

SUMMARY

To achieve the object, the present disclosure provides a liquid detection device, which comprises: a substrate; a working electrode disposed on the substrate, wherein the working electrode comprises a first metal portion and a first sensing portion, and the first sensing portion is disposed on the first metal portion; and a reference electrode disposed on the substrate.

The present disclosure also provides a method for manufacturing a liquid detection device, which comprises the following steps: providing a substrate; forming a metal layer on the substrate; patterning the metal layer to form a first metal portion and a second metal portion; and forming a working electrode and a reference electrode, wherein the working electrode comprises the first metal portion, and the reference electrode comprises the second metal portion.

Other novel features of the disclosure will become more apparent from the following detailed description when taken in conjunction with the accompanying drawings.

DETAILED DESCRIPTION OF EMBODIMENT

Figure 1A:
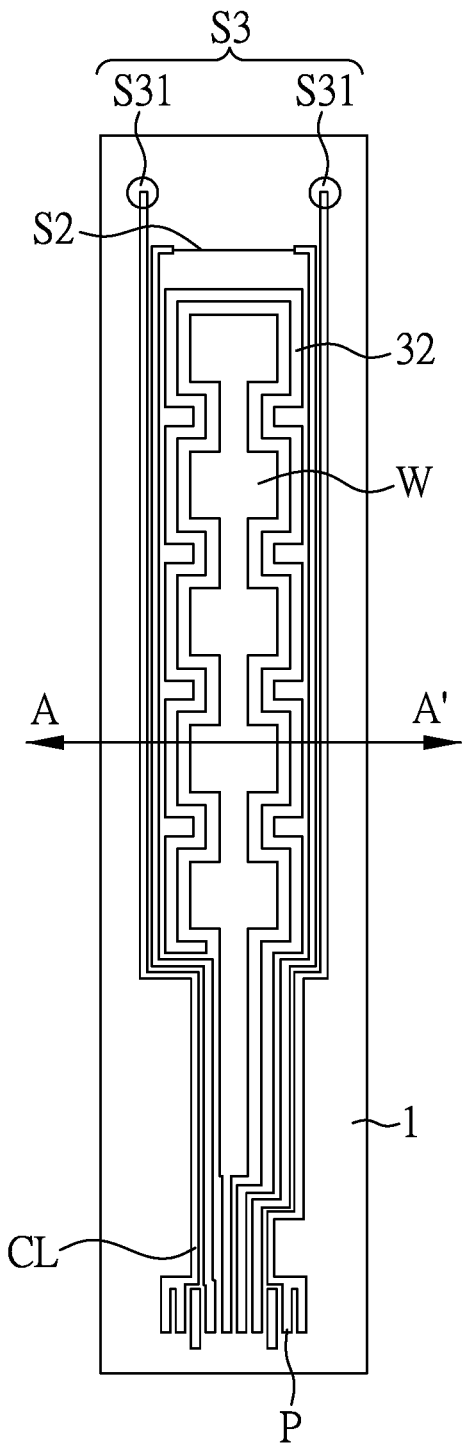
FIG. 1A to FIG. 1D are schematic views showing the steps for manufacturing a liquid detection device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified.

Furthermore, the ordinals recited in the specification and the claims such as "first", "second", "third" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the present disclosure, the terms "almost", "about" and "approximately" usually mean within 20%, within 10%, within 5%, within 3%, within 2%, within 1%, or within 0.5% of a given value or range. The quantity given here is an approximate quantity, that is, without specifying "almost", "about" and "approximately", it can still imply "almost", "about" and "approximately".

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element. Furthermore, it will be understood that if the device in the figures were turned upside down, elements described on the "lower" side would then become elements described on the "upper" side.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation. In addition, the present disclosure may be combined with other known structures to form other embodiments.

The direction X, the direction Y and the direction Z are marked in FIG. 1. The direction Z may be the normal direction of the upper surface of the substrate 1 or the top-view direction of the liquid detection device. The direction Z may be perpendicular to the direction X and the direction Y, and the direction X may be perpendicular to the direction Y.

Figure 1B:
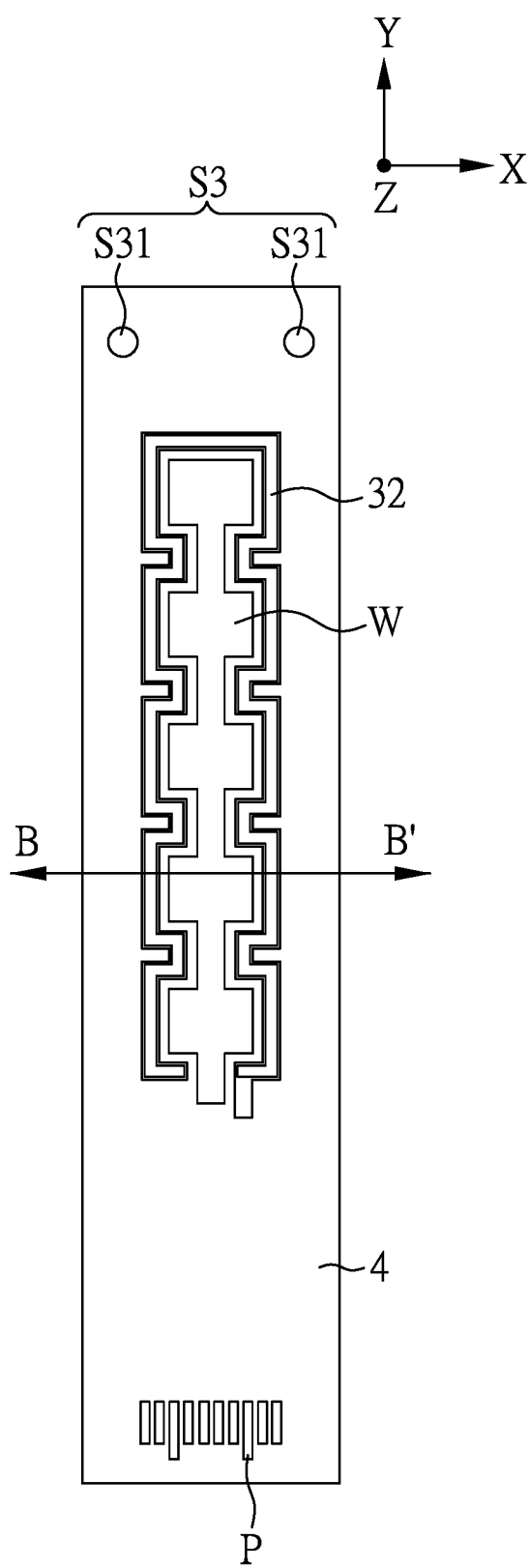
Figure 1C:
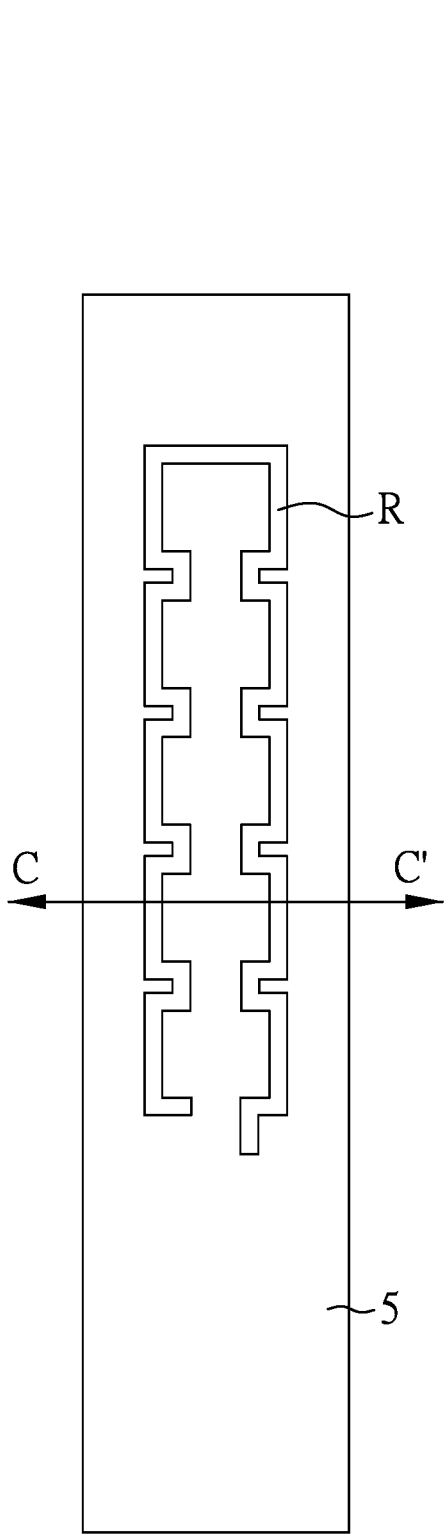

FIG. 1A to FIG. 1D are schematic views showing the steps for manufacturing a liquid detection device according to one embodiment of the present disclosure. FIG. 2A to FIG. 2D are schematic cross-sectional views of FIG. 1A to FIG. 1D. More specifically, FIG. 2A is a schematic cross-sectional view along the line A-A' of FIG. 1A, FIG. 2B is a schematic cross-sectional view along the line B-B' of FIG. 1B, FIG. 2C is a schematic cross-sectional view along the line C-C' of FIG. 1C, and FIG. 2D is a schematic cross-sectional view along the line D-D' of FIG. 1D.

Figure 1D:
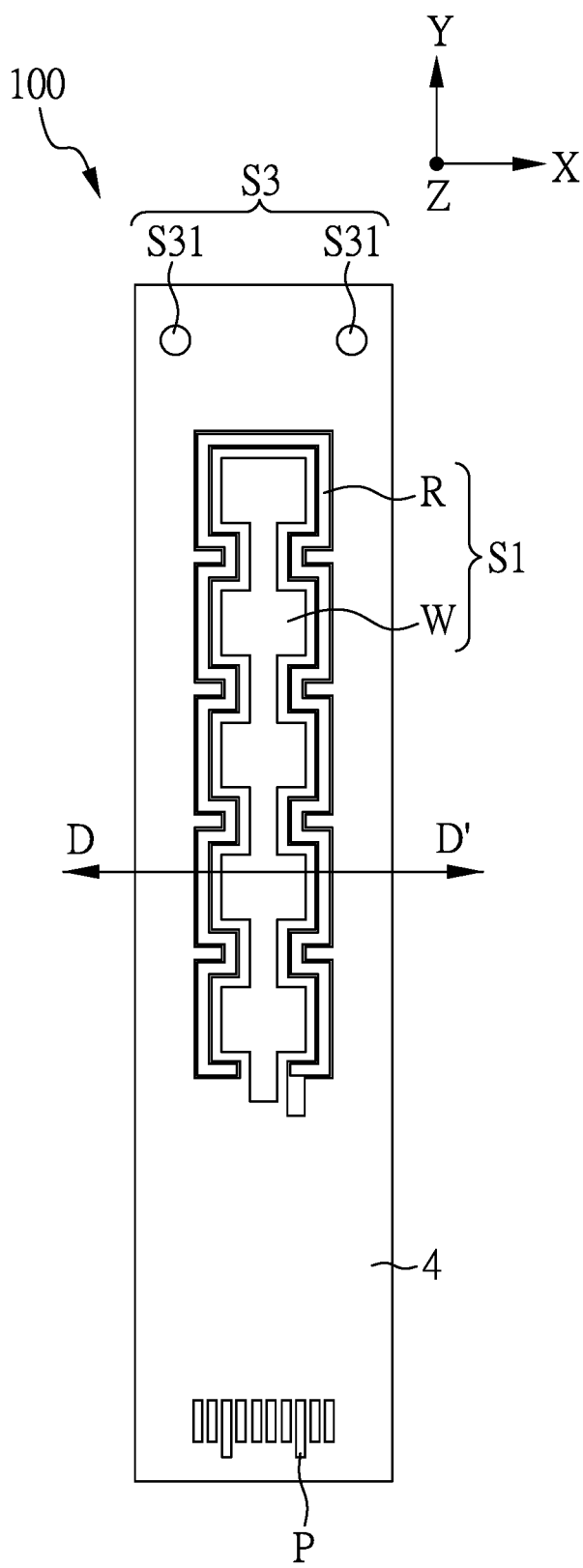
Figure 2A:
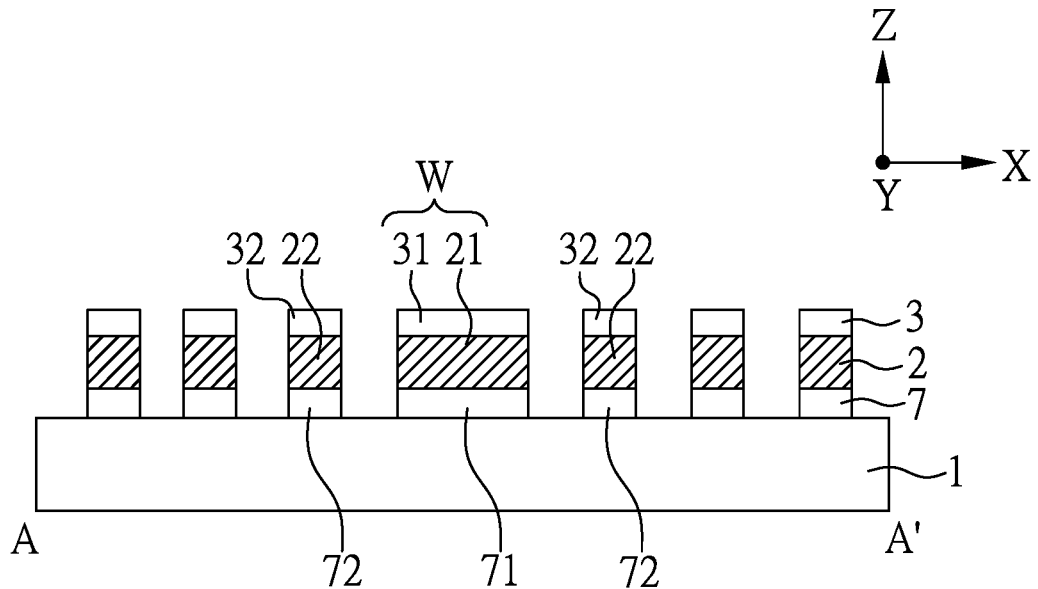
FIG. 2A is a schematic cross-sectional view along the line A-A' of FIG. 1A.
Figure 2B:
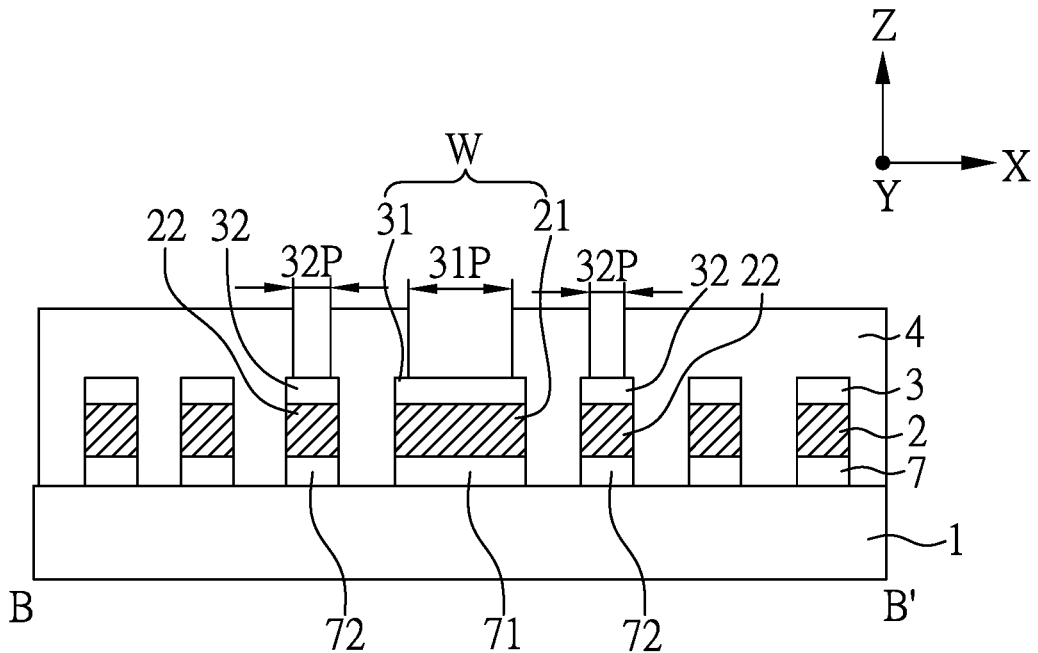
FIG. 2B is a schematic cross-sectional view along the line B-B' of FIG. 1B.
Figure 2C:
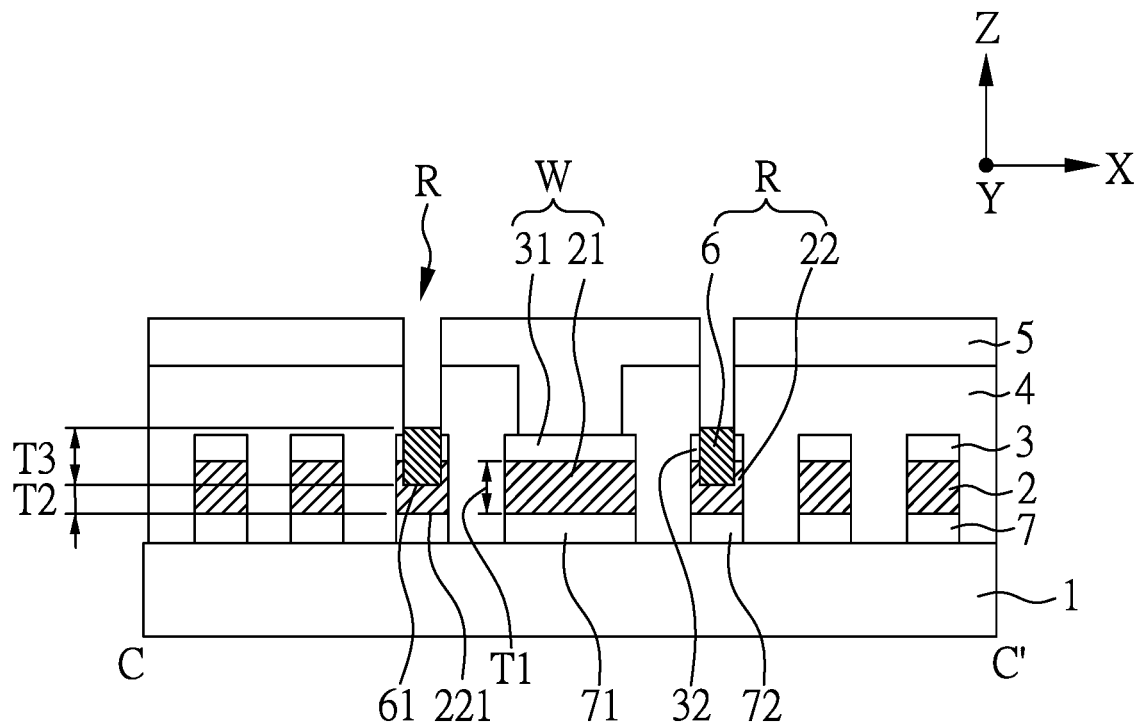
FIG. 2C is a schematic cross-sectional view along the line C-C' of FIG. 1C.
Figure 2D:
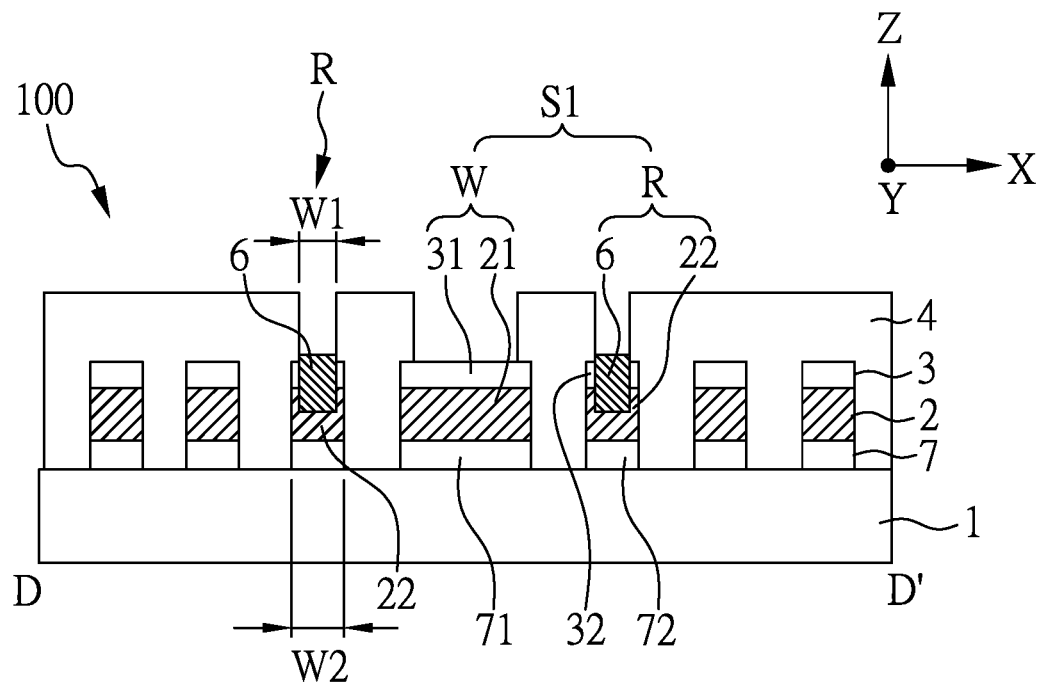
FIG. 2D is a schematic cross-sectional view along the line D-D' of FIG. 1D.

FIG. 1D is a top view of a liquid detection device according to one embodiment of the present disclosure, and FIG. 2D is a schematic cross-sectional view along the line D-D' of FIG. 1D. As shown in FIG. 1D and FIG. 2D, the liquid detection device 100 comprises: a substrate 1; a working electrode W disposed on the substrate 1; and a reference electrode R disposed on the substrate 1. The working electrode W comprises a first metal portion 21 and a first sensing portion 31, and the first sensing portion 31 is disposed on the first metal portion 21.

Hereinafter, the process steps for manufacturing the liquid detection device 100 are described. As shown in FIG. 1A to FIG. 2D, a substrate 1 is provided first, wherein the substrate 1 may be a non-flexible substrate, a flexible substrate, a film, or a combination thereof. The material of the substrate 1 may include, for example, quartz, glass, silicon wafer, sapphire, polycarbonate (PC), polyimide (PI), polypropylene (PP), polyethylene terephthalate (PET), or other plastic or polymer materials, other inorganic materials or other organic materials, or a combination of the foregoing; but the present disclosure is not limited thereto. In one embodiment of the present disclosure, the material of the substrate 1 may include glass, and thus the acid and alkali resistance of the liquid detection device can be improved.

Then, a metal layer 2 is formed on the substrate 1. The metal layer 2 is patterned to form a first metal portion 21 and a second metal portion 22. The first metal portion 21 and the second metal portion 22 may be the same layer. Herein, the material of the metal layer 2 may include, for example, gold, silver, copper, aluminum, titanium, chromium, nickel, molybdenum, a combination thereof, or other conductive materials with good electrical conductivity or low resistance; but the present disclosure is not limited thereto. In addition, the metal layer 2 may have a single-layer or multi-layer structure. The thickness of the metal layer 2 may be in a range from 5000 Å to 10000 Å; but the present disclosure is not limited thereto. In one embodiment of the present disclosure, the material of the metal layer 2 comprises silver, and thus the process can be simplified.

Then, a sensing layer 3 is formed on the metal layer 2. The sensing layer 3 is patterned to form a first sensing portion 31 and a second sensing portion 32. The first sensing portion 31 is disposed on the first metal portion 21, and the second sensing portion 32 is disposed on the second metal portion 22. The first sensing portion 31 and the second sensing portion 32 may be the same layer. Thus, as shown in FIG. 1A and FIG. 2A, a working electrode W is formed, which may comprise the first metal portion 21 and the first sensing portion 31. In the subsequent process, the sensing layer 3 can be used to provide protection to prevent the metal layer 2 from being scratched or deteriorated due to the reaction with air or chemical agents. Thus, the accuracy of the liquid detection device can be improved. Herein, the material of the sensing layer 3 may include a metal oxide, for example, may include indium tin oxide (ITO), zinc dioxide, tin dioxide, indium zinc oxide (IZO), indium tin zinc oxide (ITZO), indium gallium zinc oxide (IGZO), aluminum zinc oxide (AZO) or ruthenium oxide ($RuO_2$; $RuO_4$); but the present disclosure is not limited thereto. The thickness of the sensing layer 3 may be in a range from 250 Å to 1000 Å; but the present disclosure is not limited thereto. In addition, a ratio of the thickness of the metal layer 2 to the thickness of the sensing layer 3 may be in a range from 5 to 40. In one embodiment of the present disclosure, the material of the sensing layer 3 may include indium tin oxide.

In some embodiments, the method of forming the metal layer 2 and the sensing layer 3 can be any deposition method, such as an evaporation method, a sputtering method, an ion beam evaporation method or other coating methods. The metal layer 2 and the sensing layer 3 may be patterned by a lithography process and an etching method. The etching method may be, for example, dry etching or wet etching. According to some embodiments, the metal layer 2 and the sensing layer 3 may be patterned in the same step. According to some embodiments, the metal layer 2 and the sensing layer 3 may be patterned in different steps. However, the present disclosure is not limited thereto. The patterning method used in the present disclosure may be a lithography process and an etching method. To simplify the description, the patterning method is not described again in the following embodiments.

Then, as shown in FIG. 2B, an insulating layer is formed on the sensing layer 3 at a temperature of less than 180° C., followed by patterning the insulating layer to form a first insulating layer 4 on the sensing layer 3. The first insulating layer 4 partially covers the first sensing portion 31 and the second sensing portion 32. In other words, the first insulating layer 4 partially covers the sensing layer 3 and exposes a part 31P of the first sensing portion 31 and a part 32P of the second sensing portion 32. When the insulating layer is formed at a temperature of less than 180° C. (for example, the temperature ranging from 120° C. to 150° C. or 70° C. to 150° C., but the present disclosure is not limited thereto), the crystallization of the sensing layer 3 due to the high process temperature can be prevented, wherein the crystallization of the sensing layer 3 may affect the subsequent processing. Herein, the first insulating layer 4 may include an inorganic material, an organic material or a combination thereof. The organic material may include, for example, an acrylic-based, silicon oxide ($SiO_2$)-based, or mixing-based organic protective layer material; but the present disclosure is not limited thereto. The inorganic material may include, silicon nitride ($SiN_x$), $SiN_x$:H, silicon oxynitride ($SiO_xN_y$), $SiO_xN_y$:H, aluminum nitride, aluminum oxynitride or other suitable nitride material; but the present disclosure is not limited thereto. The thickness of the first insulating layer 4 may be in a range from 0.1 μm to 20 μm, for example, may be less than 1 μm, 2 μm to 15 μm; but the present disclosure is not limited thereto. In one embodiment of the present disclosure, the inorganic material is silicon nitride to avoid oxygen contained in the material, and thus the detection accuracy of the pH value can further be improved.

According to some embodiments, the first insulating layer 4 may include an organic material, an inorganic material or a combination thereof. The method for forming the insulating layer may be dip coating, spin coating, roller coating, blade coating, spray coating, or deposition. The method for patterning the insulating layer may be etching, such as dry etching or wet etching. According to some embodiments, the first insulating layer 4 may include an organic material and an inorganic material. In this case, an inorganic insulating layer may be formed on the sensing layer 3 first, followed by forming an organic insulating layer on the inorganic insulating layer; but the present disclosure is not limited thereto.

As shown in FIG. 2B and FIG. 2C, a photoresist 5 is formed on the first insulating layer 4, and the photoresist 5 covers the first insulating layer 4 and the working electrode W. More specifically, the photoresist 5 covers the part 31P of the first sensing portion 31 of the working electrode W and exposes the part 32P of the second sensing portion 32. Herein, the photoresist 5 is not particularly limited and may be, for example, positive or negative photoresist.

Then, at least a part of the exposed part 32P of the second sensing portion 32 is removed to expose at least a part of the second metal portion 22. Herein, the method for removing the second sensing portion 32 is not particularly and may be, for example, dry etching or wet etching; but the present is not limited thereto.

The exposed part of the second metal portion 22 is treated to form a metal compound portion 6. As shown in FIG. 1C and FIG. 2C, the metal compound portion 6 is disposed on the second metal portion 22. The material of the metal compound portion 6 may include silver chloride, silver oxide or a combination thereof; but the present disclosure is not limited thereto. When the material of the metal layer 2 includes silver, a part of the metal layer 2 may undergo redox reaction by, for example, the electrolysis or solution method to form the metal compound portion 6; but the present disclosure is not limited thereto. Herein, the part of the metal layer 2 that undergoes the redox reaction refers to a part of the second metal portion 22 that is not covered by the photoresist 5 or the first insulating layer 4. More specifically, the redox reaction can be performed on the part of the second metal portion 22 not covered by the photoresist 5 or the first insulating layer 4, so the part of the second metal portion 22 may be consumed and converted into the metal compound portion 6. In addition, when the material of the metal layer 2 does not comprise silver, a silver layer may be formed on the metal layer 2 first, and the silver layer undergoes redox reaction by electrolysis or solution method to form the metal compound portion 6. In one embodiment of the present disclosure, the metal compound portion 6 comprises silver chloride.

After removing the photoresist 5, the liquid detection device 100 of the present disclosure can be obtained. As shown in FIG. 1D and FIG. 2D, the liquid detection device 100 comprises: a substrate 1; a working electrode W disposed on the substrate 1, wherein the working electrode W comprises a first metal portion 21 and a first sensing portion 31, and the first sensing portion 31 is disposed on the first metal portion 21; and a reference electrode R disposed on the substrate 1. The reference electrode R may comprise a second metal portion 22 and a metal compound portion 6, and the metal compound portion 6 is disposed on the second metal portion 22. According to some embodiment, the first metal portion 21 and the second metal portion 22 are the same layer. In addition, as shown in FIG. 1D, the working electrode W and the reference electrode R are electrically isolated. The working electrode W and the reference electrode R can form a sensing module S1. The liquid detection device may include the sensing module S1.

According to some embodiments, the sensing module S1 may be a pH sensing module. The pH sensing module may be used to detect the pH value of a solution to be detected. When the working electrode W is affected by the pH values of different solutions to be detected, that is, the different solutions have different hydrogen ion concentrations, the working electrode W can have different induced voltage changes to detect the pH values of different solutions to be detected. More specifically, for the pH value sensing, hydrogen ions or hydroxide ions in the solution to be detected are absorbed on the surface of the sensing layer 3 (the first sensing portion 31) when the sensing layer 3 is in contact with the solution to be detected. The surface potential of the first sensing portion 31 of the sensing layer 3 is changed according to the absorption amount of the hydrogen ions or the hydroxide ions, a solution having a known pH value is used for pre-calibration, and the pH value of the solution to be detected can be obtained. According to some embodiments, the first sensing portion 31 may include a metal oxide. When performing the detection, the hydrogen ions or the hydroxide ions in the solution to be detected may absorb on the surface of the metal oxide. In addition, according to some embodiments, the surface of the first sensing portion 31 may be modified with gold nano-particles. In this case, the working electrode W may be used as a sensing electrode for glucose, which can be applied to the sensing of glucose.

In the cross-sectional view of FIG. 2D, the first insulating layer 4 is disposed on the working electrode W and the reference electrode R, and the first insulating layer 4 may partially cover of the sensing layer 3 and the metal layer 2. More specifically, the first insulating layer 4 may partially cover the first sensing portion 31 and the second sensing portion 32 of the sensing layer 3, and partially cover the first metal portion 21 and the second metal portion 22 of the metal layer 2. Thus, the risk of electrode deterioration caused by subsequent etching or other processes can be reduced, and the accuracy of the liquid detection device can be improved. According to some embodiment, the width W1 of the metal compound portion 6 may be less than the width W2 of the second metal portion 22. The term "partially cover" refers that the projection of the first insulating layer 4 on the substrate 1 may partially overlap the projections of the sensing layer 3 and the metal layer 2 on the substrate 1 in the normal direction Z of the substrate 1. More specifically, the projection of the first insulating layer 4 on the substrate 1 may partially overlap the projections of the first sensing portion 31 and the second sensing portion 32 of the sensing layer 3 on the substrate 1, and partially overlap the projections of the first metal portion 21 and the second metal portion 22 of the metal layer 2 on the substrate 1.

In addition, as shown in FIG. 2C, in the normal direction Z of the substrate 1, the first metal portion 21 has a first thickness T1, there is a second thickness T2 between the bottom surface 61 of the metal compound portion 6 and the bottom surface 221 of the second metal portion 22, and a ratio of the second thickness T2 to the first thickness T1 is in a range from 0.3 to 0.8. When the ratio of the second thickness T2 to the first thickness T1 is greater than 0.8, it means that the thickness of the metal compound portion 6 is smaller, and the lifetime of the liquid detection device 100 is shorter. When the ratio of the second thickness T2 to the first thickness T1 is less than 0.3, the detection accuracy of the pH value may be affected.

Furthermore, in the normal direction Z of the substrate 1, the metal compound portion 6 has a third thickness T3, and a ratio of the third thickness T3 to the second thickness T2 may be in range from 0.8 to 2.0. When the ratio of the third thickness T3 to the second thickness T2 is greater than 2.0, it means that the thickness of the metal compound portion 6 is thicker, and the pore structure of the metal compound portion 6 may lead to poor reliability. When the ratio of the third thickness T3 to the second thickness T2 is less than 0.8, the reference accuracy of the reference electrode R may be affected.

In addition, as shown in FIG. 1A to FIG. 2D, in one embodiment of the present disclosure, a step of forming an adhesion layer 7 on the substrate 1 may be performed before forming the metal layer 2 on the substrate 1. Thus, the adhesion layer 7 may be formed between the substrate 1 and the metal layer 2. Then, the adhesion layer 7 is patterned to form a first adhesion portion 71 and a second adhesion portion 72. The first metal portion 21 is disposed on the first adhesion portion 71, and the second metal portion 22 is disposed on the second adhesion portion 72. Thus, the first adhesion portion 71 is disposed between the first metal portion 21 and the substrate 1, and the second adhesion portion 72 is disposed between the second metal portion 22 and the substrate 1. According to some embodiments, the first adhesion portion 71 and the second adhesion portion 72 may be the same layer.

In addition, the material of the adhesion layer 7 and the sensing layer 3 may be the same or different. When the materials of the adhesion layer 7 and the sensing layer 3 are the same, the material and forming method of the adhesion layer 7 can be referred to those of the sensing layer 3 illustrated above, and are not described again. In one embodiment of the present disclosure, the material of the adhesion layer 7 may be a metal oxide, and may include, for example, indium tin oxide. When the material of the substrate 1 comprises glass, there is a problem of poor adhesion between the metal layer 2 and the substrate 1, resulting in the deterioration such as peeling. The adhesion layer 7 can improve the adhesion between the metal layer 2 and the substrate 1, and reduce the deterioration.

As shown in FIG. 1A, in addition to the sensing module S1, the liquid detection device of the present disclosure may further comprise a temperature sensing unit S2 and/or a conductivity sensing electrode set S3 to detect the temperature and/or conductivity of the solution to be detected. Furthermore, the liquid detection device 100 of the present disclosure may further comprise a plurality of contact pads P respectively electrically connected to the sensing module S1, the temperature sensing unit S2 and/or the conductivity sensing electrode set S3 through conductive lines CL. Thus, an external electrical component may be electrically connected to the liquid detection device 100 through the contact pads P, and the signals detected by the liquid detection device may be transferred to the external electrical component. In addition, even not shown in the figure, the liquid detection device 100 of the present disclosure may further comprise other components such as antenna to provide various functions. In the present disclosure, the conductive lines CL and the contact pads P may respectively comprise the metal layer 2 and the sensing layer 3, but the present disclosure is not limited thereto. When the adhesion layer 7 comprises the conductive metal oxide, the conductive lines CL and the contact pads P may further respectively comprise the adhesion layer 7.

Figure 3A:
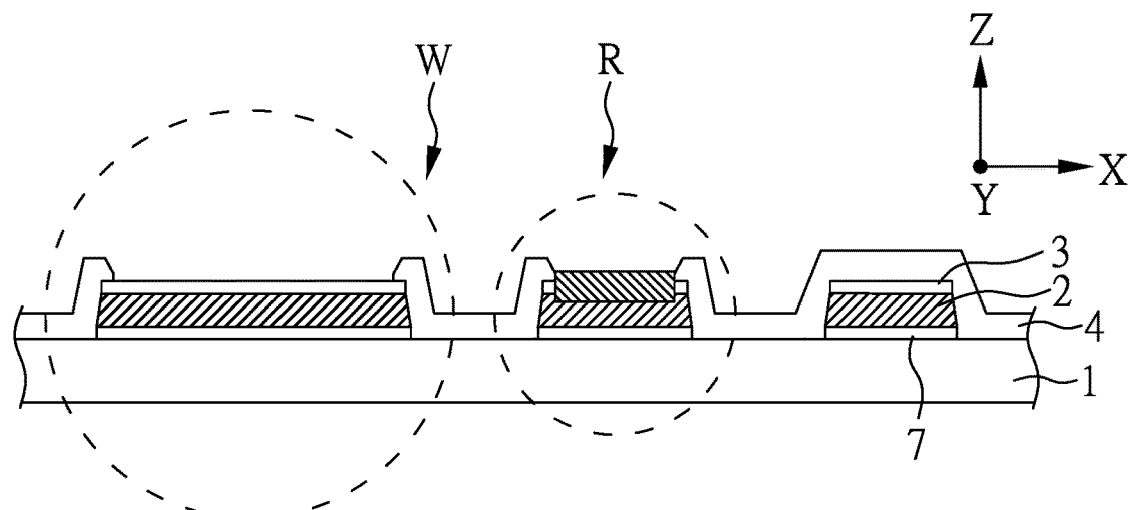
FIG. 3A is a schematic cross-sectional view of a liquid detection device according to one embodiment of the present disclosure.
Figure 3B:
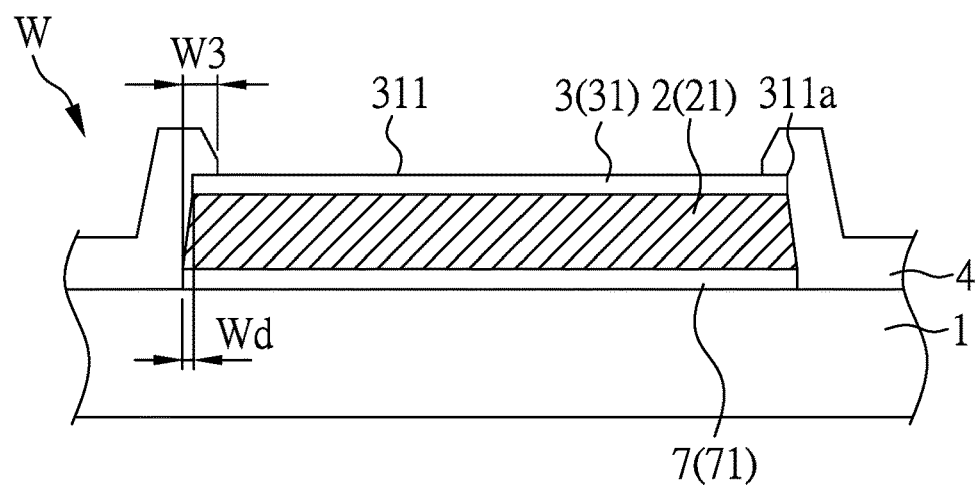
FIG. 3B is an enlarged view of a working electrode W of FIG. 3A.
Figure 3C:
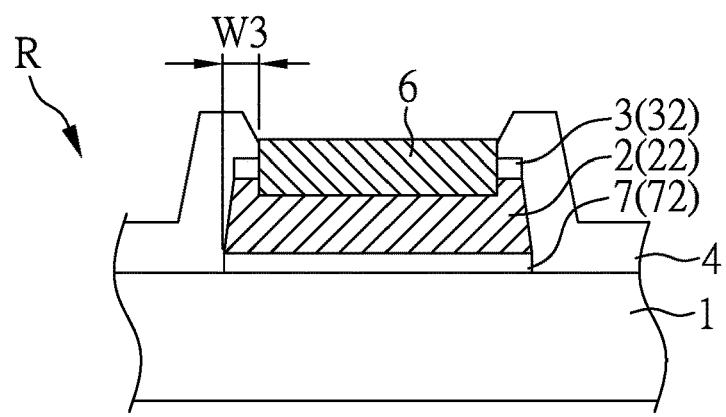
FIG. 3C is a partial enlarged view of a reference electrode R of FIG. 3A.

FIG. 3A to FIG. 3C are schematic cross-sectional views of a liquid detection device according to one embodiment of the present disclosure. More specifically, FIG. 3B is an enlarged view of a working electrode W of FIG. 3A, and FIG. 3C is a partial enlarged view of a reference electrode R of FIG. 3A. The liquid detection device of FIG. 3A is similar to that of FIG. 2D, except for the following differences.

When the first insulating layer 4 is made of an organic material, the thickness of the first insulating layer 4 may be in a range from 2 μm to 15 μm. Thus, the thickness of the first insulating layer 4 is thicker and the first insulating layer 4 has a planarization effect, as shown in FIG. 2D. When the first insulating layer 4 is made of an inorganic material, the thickness of the first insulating layer 4 may be less than 1 μm, as shown in FIG. 3A.

In addition, the sensing layer 3, the adhesion layer 7 and the metal layer 2 may be patterned by the same process to simplify the process steps. Thus, the width of the first sensing portion 31, the width of the first adhesion portion 71 and the width of the first metal portion 21 may be approximately the same. According to some embodiment, a ratio of the width of the first adhesion portion 71 to the width of the first sensing portion 31 may be in a range from 0.98 to 1.02. A ratio of the width of the first sensing portion 31 to the width of the first metal portion 21 may be in a range from 0.98 to 1.02. In some embodiments of the present disclosure, as shown in the cross-sectional view of FIG. 3B, the first sensing portion 31, the first metal portion 21 and the first adhesion portion 71 may have a trapezoidal structure. For example, the width of the first adhesion portion 71 may be greater than the width of the first sensing portion 31, and a width difference Wd between the first sensing portion 31 and the first adhesion portion 71 may be less than or equal to 5 μm; but the present disclosure is not limited thereto.

In addition, to reduce the risk of the electrode deterioration, as shown in the cross-sectional views of FIG. 3B and FIG. 3C, the first insulating layer 4 may partially cover the sensing layer 3 and the metal layer 2. More specifically, the first insulating layer 4 may partially cover the first sensing portion 31 and the second sensing portion 32 of the sensing layer 3, and partially cover the first metal portion 21 and the second metal portion 22 of the metal layer 2. In other words, in the normal direction Z of the substrate 1, the projection of the first insulating layer 4 on the substrate 1 may partially overlap the projections of the first metal portion 21 and the second metal portion 22 of the metal layer 2 on the substrate 1, and the widths W3 of the portion that the first insulating layer 4 partially overlaps the metal layer 2 may be respectively in a range from 0.4 μm to 500 μm. In one embodiment of the present disclosure, the working electrode W comprises a surface 311. In a top view direction Z, the surface 311 has an edge 311a, and the edge 311a extends along the direction Y, wherein the first insulating layer 4 may cover the edge 311a of the surface 311 of the working electrode W.

Figure 4A:
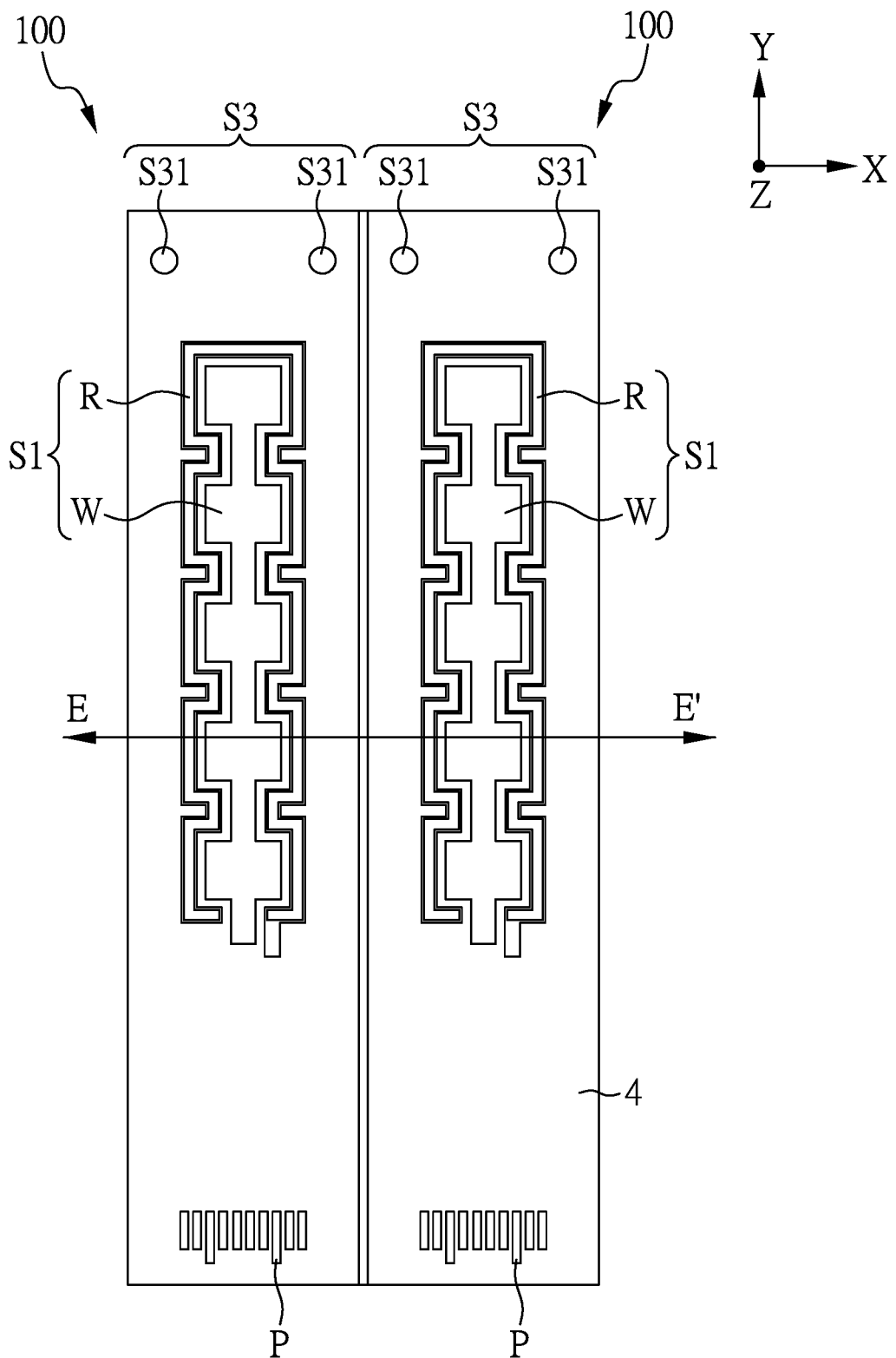
FIG. 4A is a top view of a liquid detection device according to one embodiment of the present disclosure.
Figure 4B:
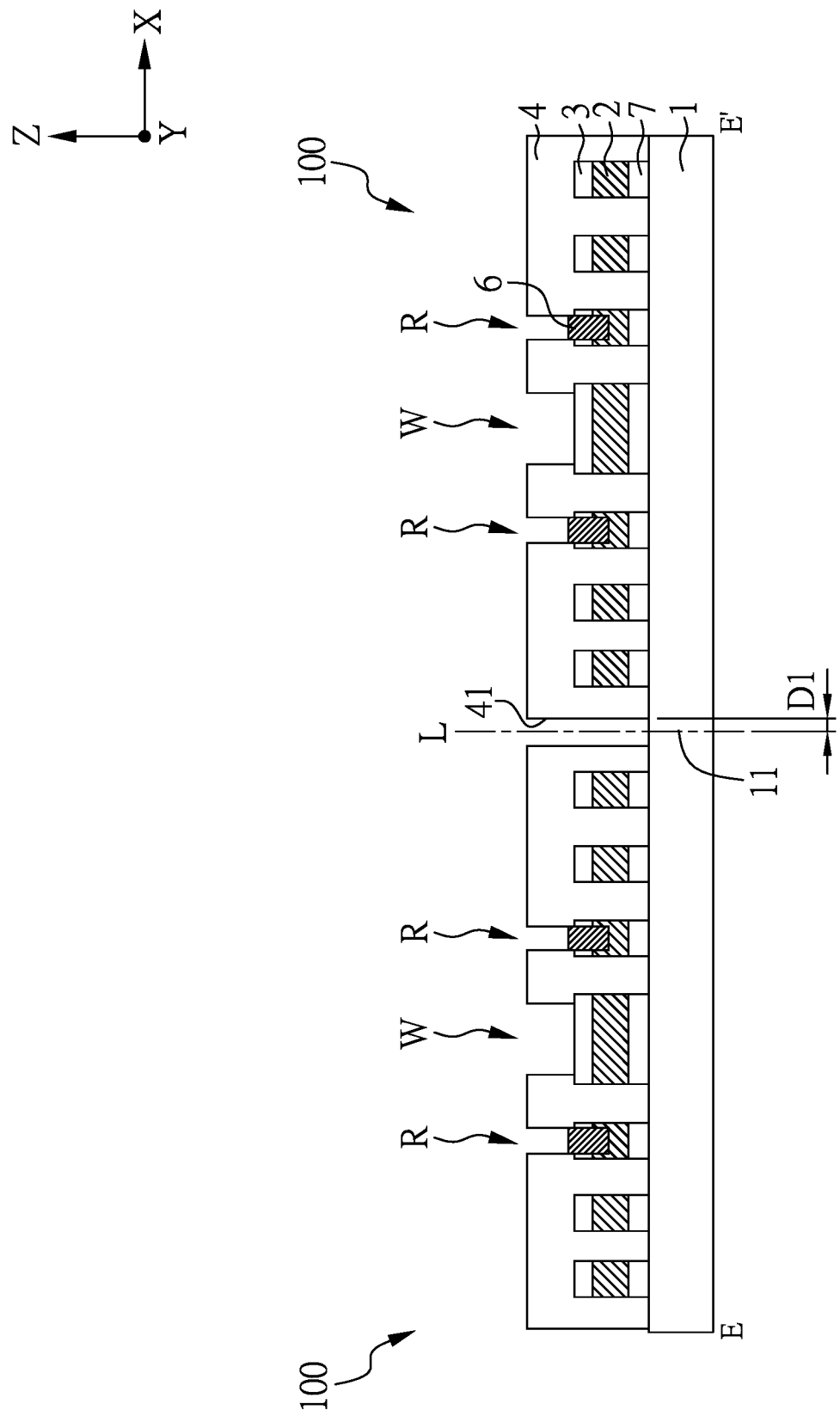
FIG. 4B is a schematic cross-sectional view along the line E-E' of FIG. 4A.
Figure 4C:
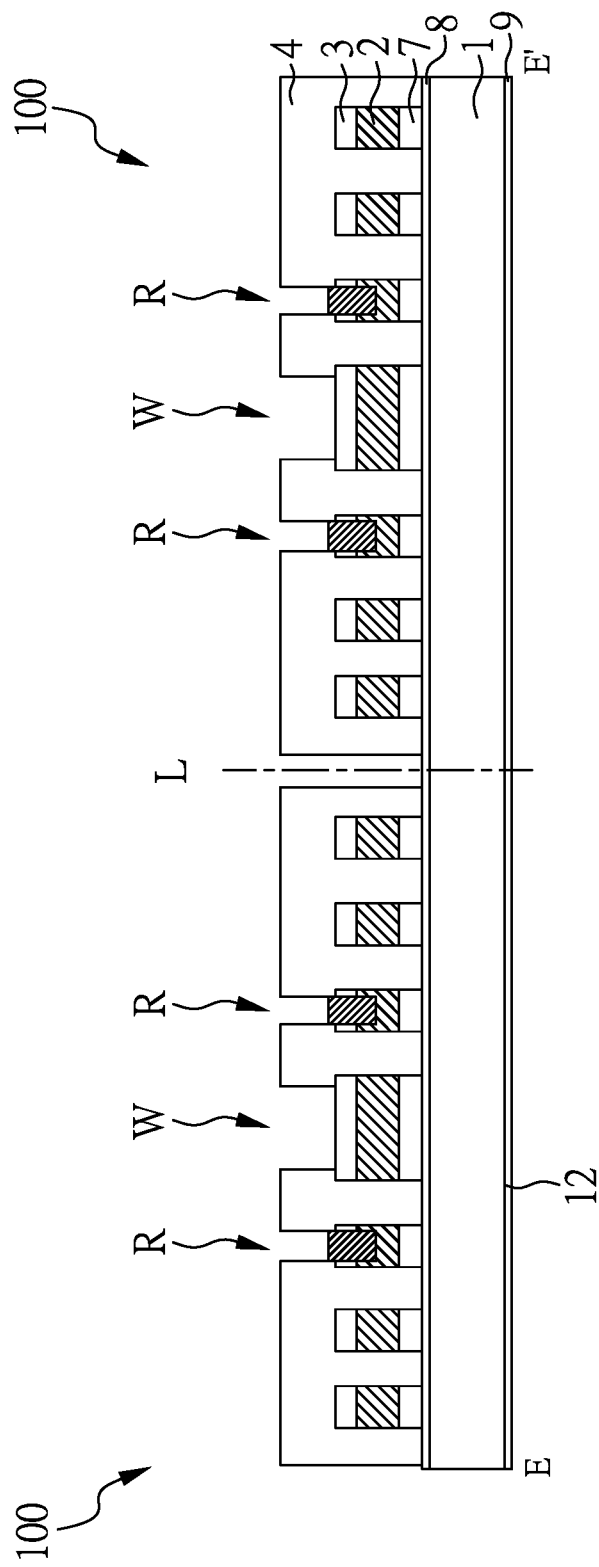
FIG. 4C is another schematic cross-sectional view along the line E-E' of FIG. 4A.

FIG. 4A to FIG. 4C are schematic views of a liquid detection device according to one embodiment of the present disclosure. More specifically, FIG. 4A is a top view of a liquid detection device according to one embodiment of the present disclosure, FIG. 4B is a schematic cross-sectional view along the line E-E' of FIG. 4A, and FIG. 4C is another schematic cross-sectional view along the line E-E' of FIG. 4A. Except for the following differences, the liquid detection device shown in FIG. 4A to FIG. 4C is similar to the liquid detection device shown in FIG. 2D, and the detail structure thereof can be referred to that shown in FIG. 2D.

As shown in FIG. 4A and FIG. 4B, in the preparing process, a plurality of liquid detection devices 100 may be simultaneously formed on one substrate and then separated through a cutting step along the cutting line L to obtain the liquid detection device 100 of the present disclosure. Thus, in the present disclosure, as shown in FIG. 4B, the substrate 1 after cutting has a first side wall 11, the first insulating layer 4 has a second side wall 41, and a minimum distance D1 between the first side wall 11 and the second side wall 41 may be ranged from 25 μm to 1000 μm. Hence, the defects such as cracks caused by cutting can be reduced. Herein, FIG. 4A and FIG. 4B show the situation that two liquid detection devices 100 formed on one substrate. However, in other embodiments of the present disclosure, a plurality of liquid detection devices 100 may be simultaneously formed on one substrate.

Furthermore, in another embodiment of the present disclosure, as shown in FIG. 4C, a step of forming a second insulating layer 8 on the substrate 1 may be performed before the step of forming the metal layer 2 on the substrate 1. Thus, the liquid detection device 100 of the present disclosure may further comprise a second insulating layer 8 disposed between the substrate 1 and the working electrode W and between the substrate 1 and the reference electrode R. More specifically, the second insulating layer 8 is disposed between the metal layer 2 and the substrate 1 or between the adhesion layer 7 and the substrate 1. Thus, the adhesion between the metal layer 2 and the substrate 1 or between the adhesion layer 7 and the substrate 1 can be increased, and the occurrence of the deterioration such as peeling can be reduced.

Moreover, as shown in FIG. 4C, in another embodiment of the present disclosure, a step of forming a third insulating layer 9 below the substrate 1 may be performed. Thus, the liquid detection device 100 of the present disclosure may further comprise a third insulating layer 9 disposed under the substrate 1, and the substrate 1 is disposed between the third insulating layer 9 and the working electrode W and between the third insulating layer 9 and the reference electrode R. More specifically, the third insulating layer 9 is disposed on a side 12 of the substrate 1 away from the working electrode W and the reference electrode R, and the substrate 1 is disposed between the third insulating layer 9 and the metal layer 2 or between the third insulating layer 9 and the adhesion layer 7. Thus, the third insulating layer 9 may be used as a protection layer under the substrate 1 to reduce the ability of the substrate 1 to absorb hydrogen ions or hydroxide ions and improve the detection accuracy of the pH value.

As shown in FIG. 4C, in one embodiment of the present disclosure, the liquid detection device 100 may simultaneously comprise the second insulating layer 8 and the third insulating layer 9, but the present disclosure is not limited thereto. In other embodiments of the present disclosure, the liquid detection device 100 may comprise either the second insulating layer 8 or the third insulating layer 9. Herein, the materials of the second insulating layer 8 and the third insulating layer 9 may be referred to that of the first insulating layer 4 and are not described again.

Figure 5:
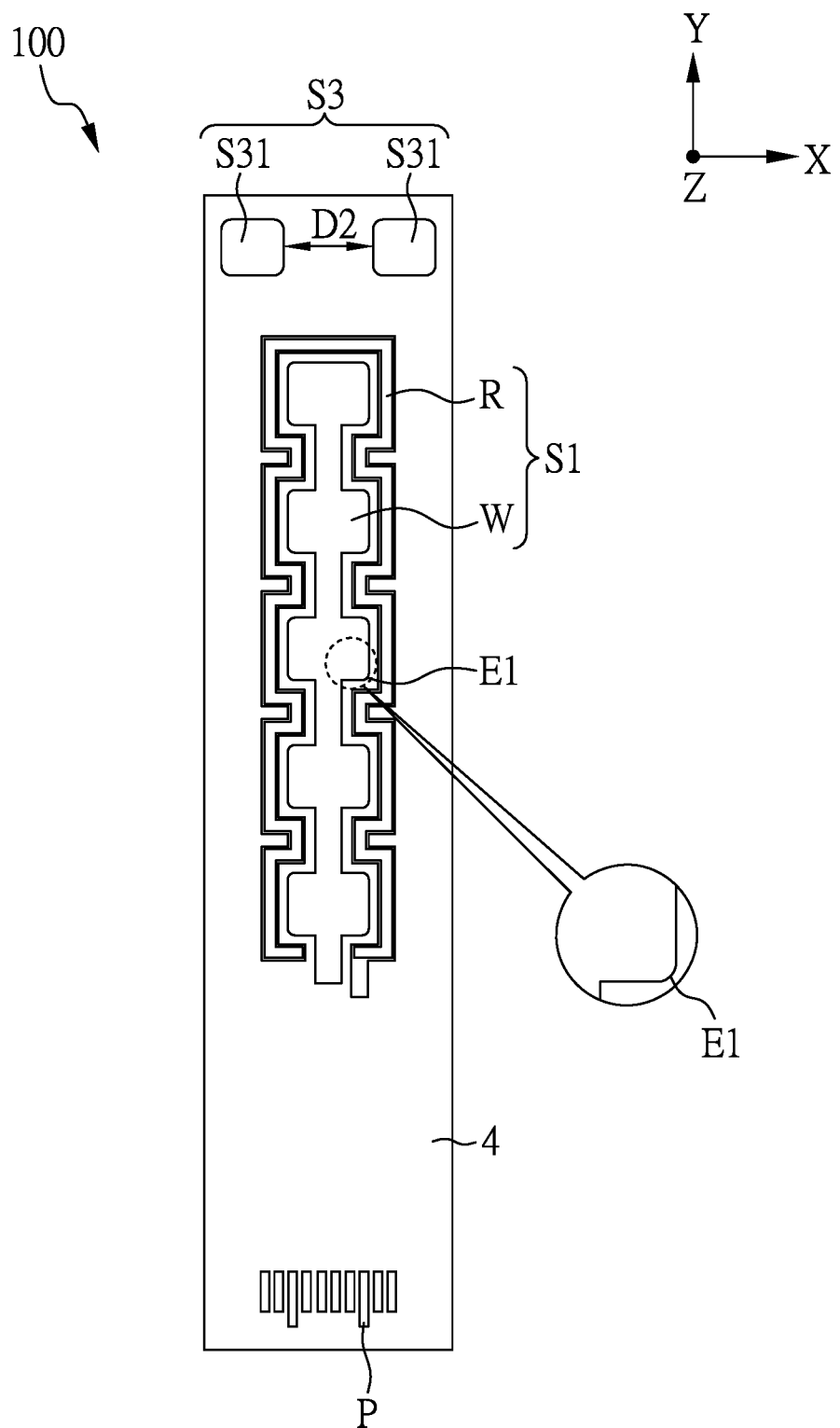
FIG. 5 is a top view of a liquid detection device according to one embodiment of the present disclosure.

FIG. 5 is a top view of a liquid detection device according to one embodiment of the present disclosure. The liquid detection device of FIG. 5 is similar to that shown in FIG. 1D, except for the following differences.

As shown in FIG. 5, the liquid detection device 100 of the present disclosure may comprise a sensing module S1, a temperature sensing unit (not shown in the figure) and a conductivity sensing electrode set S3. In a top view direction Z, the working electrode W of the sensing module S1 may have a curved edge E1. According to some embodiments, the radius of curvature of the curved edge E1 may be in a range from 25 μm to 250 μm, so the detection accuracy of the pH value can be improved. When the radius of curvature of the curved edge E1 is greater than 250 μm, the area of the working electrode W is small, and the detection accuracy of the pH value may be reduced. When the radius of curvature of the curved edge E1 is less than 25 μm, charges may be easily accumulated and impurities may be easily absorbed at the tip or the corner, and the detection accuracy of the pH value may be affected. Similarly, in the top view direction Z, the reference electrode R of the sensing module S1 may also have a curved edge to improve the detection accuracy of the pH value.

In the present disclosure, the shapes of the working electrode W and the reference electrode R are not particularly limited, and may be designed according to the need. In addition, the conductivity sensing electrode set S3 comprises at least two conductivity sensing electrodes S31. The shapes of the conductivity sensing electrodes S31 are not particularly limited and may be, for example, circular, rectangular, irregular or rectangular with curved edges. The areas of the two conductivity sensing electrodes S31 are approximately the same, and there is a predetermined distance D2 between the two conductivity sensing electrodes S31. The predetermined distance D2 divided by the area of the conductivity sensing electrode S31 may be in a range from 0.05 to 20.0 $(cm^{-1})$.

In addition, the liquid detection device of the present disclosure can detect the basic properties of liquids such as pH, temperature and/or conductivity. Thus, the liquid detection device of the present disclosure can be applied to the detection of human body fluids (such as urine, sweat, tears, blood, bile, gastric fluid, etc.), the water quality sensing system (such as water quality monitoring in aquaculture), wastewater monitoring of industrial discharge water, quality control of food or medicine, concentration monitoring of chemicals used or prepared in factory, etc.

In conclusion, the present disclosure provides a liquid detection device, wherein the working electrode and the reference electrode are disposed on the same substrate. According to some embodiments, at least one layer of the working electrode and the reference electrode (for example, the metal layer) may be the same layer to simplify the manufacturing process and improve the accuracy of the liquid detection device.

The above specific embodiments should be construed as merely illustrative, and not limiting the rest of the present disclosure in any way, and the features between different embodiments can be mixed and matched as long as they do not conflict with each other.

Although the present disclosure has been explained in relation to its embodiment, it is to be understood that many other possible modifications and variations can be made without departing from the spirit and scope of the disclosure as hereinafter claimed.

What is claimed is:

1. A liquid detection device, comprising:
   a substrate;
   a working electrode disposed on the substrate, wherein the working electrode comprises a first metal portion and a first sensing portion, and the first sensing portion is disposed on the first metal portion;
   a reference electrode disposed on the substrate, wherein the reference electrode comprises a second metal portion;
   a first adhesion portion disposed between the substrate and the first metal portion; and
   a second adhesion portion disposed between the substrate and the second metal portion,
   wherein the first adhesion portion and the second adhesion portion are the same layer, and the first adhesion portion and the second adhesion portion respectively comprise a conductive metal oxide.

2. The liquid detection device of claim 1, wherein the reference electrode comprises a metal compound portion disposed on the second metal portion, and the first metal portion and the second metal portion are the same layer.

3. The liquid detection device of claim 2, wherein a width of the metal compound portion is less than a width of the second metal portion.

4. The liquid detection device of claim 2, wherein the first metal portion has a first thickness, there is a second thickness between a bottom surface of the metal compound portion and a bottom surface of the second metal portion, and a ratio of the second thickness to the first thickness is in a range from 0.3 to 0.8.

5. The liquid detection device of claim 1, further comprising a first insulating layer disposed on the working electrode, wherein the working electrode comprises a surface having an edge, and the first insulating layer covers the edge of the surface of the working electrode.

6. The liquid detection device of claim 1, further comprising a first insulating layer disposed on the working electrode, wherein the substrate has a first side wall, the first insulating layer has a second side wall, and a minimum distance between the first side wall and the second side wall is ranged from 25 µm to 1000 µm.

7. The liquid detection device of claim 1, wherein the working electrode has a curved edge in a top view direction.

8. The liquid detection device of claim 7, wherein a radius of curvature of the curved edge is in a range from 25 µm to 250 µm.

9. The liquid detection device of claim 1, wherein the first sensing portion comprises a metal oxide.

10. A method for manufacturing a liquid detection device, comprising the following steps:
provide a substrate;
forming an adhesion layer on the substrate;
forming a metal layer on the adhesion layer;
forming a sensing layer on the metal layer;
patterning the adhesion layer to form a first adhesion portion and a second adhesion portion, wherein the first adhesion portion and the second adhesion portion respectively comprise a conductive metal oxide;
patterning the metal layer to form a first metal portion and a second metal portion, wherein the first adhesion portion is disposed between the substrate and the first metal portion, and the second adhesion portion is disposed between the substrate and the second metal portion;
patterning the sensing layer to form a first sensing portion, wherein the first sensing portion is disposed on the first metal portion; and
forming a working electrode and a reference electrode, wherein the working electrode comprises the first metal portion and the first sensing portion, and the reference electrode comprises the second metal portion.

11. The method of claim 10, further comprising the following steps:
patterning the sensing layer to form a second sensing portion, wherein the second sensing portion is disposed on the second metal portion;
removing at least part of the second sensing portion to expose at least part of the second metal portion; and
treating the at least part of the second metal portion to form a metal compound portion.

12. The method of claim 11, wherein a width of the metal compound portion is less than a width of the second metal portion.

13. The method of claim 11, wherein the first metal portion has a first thickness, there is a second thickness between a bottom surface of the metal compound portion and a bottom surface of the second metal portion, and a ratio of the second thickness to the first thickness is in a range from 0.3 to 0.8.

14. The method of claim 10, further comprising a step of: forming a first insulating layer on the working electrode after forming the working electrode and the reference electrode, wherein the working electrode comprises a surface having an edge, and the first insulating layer covers the edge of the surface of the working electrode.

15. The method of claim 10, further comprising a step of: forming a first insulating layer on the working electrode after forming the working electrode and the reference electrode, wherein the substrate has a first side wall, the first insulating layer has a second side wall, and a minimum distance between the first side wall and the second side wall is ranged from 25 µm to 1000 µm.

16. The method of claim 10, wherein the working electrode has a curved edge in a top view direction.

* * * * *